US008531547B2

United States Patent
Matsuyama

(10) Patent No.: US 8,531,547 B2
(45) Date of Patent: *Sep. 10, 2013

(54) IMAGE PROCESSING APPARATUS AND IMAGE PROCESSING METHOD

(75) Inventor: Ichiro Matsuyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,773

(22) Filed: Jun. 20, 2012

(65) Prior Publication Data

US 2012/0262591 A1    Oct. 18, 2012

Related U.S. Application Data

(63) Continuation of application No. 12/396,128, filed on Mar. 2, 2009, now Pat. No. 8,223,216.

(30) Foreign Application Priority Data

Mar. 3, 2008 (JP) .................................. 2008-051930

(51) Int. Cl.
*H04N 5/228* (2006.01)
*H04N 5/222* (2006.01)

(52) U.S. Cl.
USPC ............... 348/222.1; 348/208.14; 348/333.02

(58) Field of Classification Search
USPC .................. 348/135, 141, 142, 143, 154, 155, 348/169, 170, 171, 172, 207.99, 208.14, 348/208.15, 222.1, 231.2, 231.3, 231.5, 231.6, 348/333.01, 333.02, 333.03, 333.04
See application file for complete search history.

(56) References Cited

U.S. PATENT DOCUMENTS

| 8,223,216 | B2* | 7/2012 | Matsuyama | 348/222.1 |
| 2004/0207743 | A1* | 10/2004 | Nozaki et al. | 348/333.12 |
| 2005/0238217 | A1* | 10/2005 | Enomoto et al. | 382/128 |
| 2007/0171296 | A1* | 7/2007 | Tsukiji et al. | 348/345 |
| 2008/0309788 | A1* | 12/2008 | Onozawa | 348/222.1 |
| 2009/0219406 | A1 | 9/2009 | Matsuyama | |
| 2010/0039527 | A1* | 2/2010 | Kretz et al. | 348/222.1 |

FOREIGN PATENT DOCUMENTS

| JP | 05-030407 A | 2/1993 |
| JP | 07-140374 A | 6/1995 |
| JP | 10-232934 A | 9/1998 |
| JP | 2000-048184 A | 2/2000 |
| JP | 2004-320287 A | 11/2004 |
| JP | 2006-295707 A | 10/2006 |
| JP | 2009-069551 A | 4/2009 |

OTHER PUBLICATIONS

JP Office Action issued Jul. 24, 2012 for corresponding JP2008-051930.

* cited by examiner

*Primary Examiner* — Tuan Ho
*Assistant Examiner* — Peter Chon
(74) *Attorney, Agent, or Firm* — Rossi, Kimms & McDowell LLP

(57) ABSTRACT

An image processing apparatus and method in which auto-selecting of an object to be prioritized from among a plurality of detected objects is capable more appropriately. A characteristic detecting unit detects a previously set characteristic portion of an object from an image signal constituting a moving image. A control unit sets a priority to each characteristic portion when a plurality of the characteristic portions are detected by the characteristic detecting unit and also sets a high priority to a characteristic portion being detected for a long period of time.

7 Claims, 7 Drawing Sheets

| REGISTRY NUMBER | HORIZONTAL POSITION x | VERTICAL POSITION y | WIDTH w | TIME t |
|---|---|---|---|---|
| 1 | X1 | Y1 | W1 | T1 |
| 2 | X2 | Y2 | W2 | T2 |
| 3 | | | | |
| 4 | | | | |

IMAGE PROCESSING APPARATUS AND IMAGE PROCESSING METHOD

This is a continuation of Ser. No. 12/396,128 filed 2 Mar. 2009, the entire contents of which are herein incorporated by reference.

BACKGROUND OF THE INVENTION

1. Field of the Invention

The present invention relates to an image processing apparatus such as a video camera and an image processing method, and more particularly, to an image processing apparatus and an image processing method which recognize an object and control image processing.

2. Description of the Related Art

There have recently appeared a still camera, a monitoring camera, and the like, which recognize a portion to be regarded such as a face of an object from an image being captured, and perform camera control such as focus and exposure in accordance with the portion.

For example, a still camera as follows is known. The camera detects a plurality of faces from a captured image, and in the case of finding a face corresponding to that of a person registered in its main body, the camera controls focus and exposure in accordance with the face portion prioritizing the face, and displays a frame with respect to the face portion (e.g. Japanese Laid-Open Patent Publication (Kokai) No. 2004-320287).

Further known is a still camera that controls focus prioritizing a central portion from among a plurality of ranging portions to capture an image (e.g. Japanese Laid-Open Patent Publication (Kokai) No. 07-140374).

Moreover known is an auto-tracking camera that determines a motion vector, which was detected in the largest number among a plurality of motion vector detection frames, as a vector of a principal object (e.g. Japanese Laid-Open Patent Publication (Kokai) No. 05-030407).

However, as to the conventional camera, when another person gets into an image capturing range while the user is capturing an image of a intended person's face, focus and exposure might be controlled in accordance with another person's face against the user's expectation. Further, a frame might be displayed on another person's face against the user's expectation.

In the case of a still camera, the user can operate the camera so as to prioritize a intended object before a shutter release. But in the case of a video camera, since consecutive image capturing is performed, when focus and exposure with respect to a intended person get off the control, a large problem may occur, such as a problem of desired image quality becoming unobtainable.

In the case of the still camera disclosed in Japanese Laid-Open Patent Publication (Kokai) No. 2004-320287, processing for determining consistency with an already registered person's face is necessary to discriminate an intended object. This causes problems of complex hardware and longer software processing time.

The still camera disclosed in Japanese Laid-Open Patent Publication (Kokai) No. 07-140374 has a problem of prioritizing a person in contradiction to the user's expectation in such a case where a passerby or the like passes behind a person as an object to be captured in the center of the image capturing range.

The auto-tracking camera disclosed in Japanese Laid-Open Patent Publication (Kokai) No. 05-030407 might prioritize and capture a person in contradiction to the user's expectation in such a case where a passerby or the like passes near side of a person as an object to be captured in the image capturing range.

SUMMARY OF THE INVENTION

The present invention provides an image processing apparatus and an image processing method which are capable of more appropriately auto-selecting an object to be prioritized from among a plurality of detected objects.

Accordingly, in a first aspect of the present invention, there is provided an image processing apparatus comprising a characteristic detecting unit that detects a previously set characteristic portion of an object from an image signal constituting a moving image, and a control unit that sets a priority to each characteristic portion when a plurality of the characteristic portions are detected by the characteristic detecting unit and sets a high priority to a characteristic portion being detected for a long period of time.

Moreover, in a second aspect of the present invention, there is provided an image processing method comprising the steps of detecting a previously set characteristic portion of an object from an image signal constituting a moving image, and setting a priority to each characteristic portion when a plurality of the characteristic portions are detected, the step of setting a priority includes setting a high priority to a characteristic portion being detected for a long period of time.

According to the present invention, it is possible to appropriately control image processing on an object more appropriately auto-selected from among a plurality of detected objects.

The features and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing preferred embodiments thereof.

Figure 1:
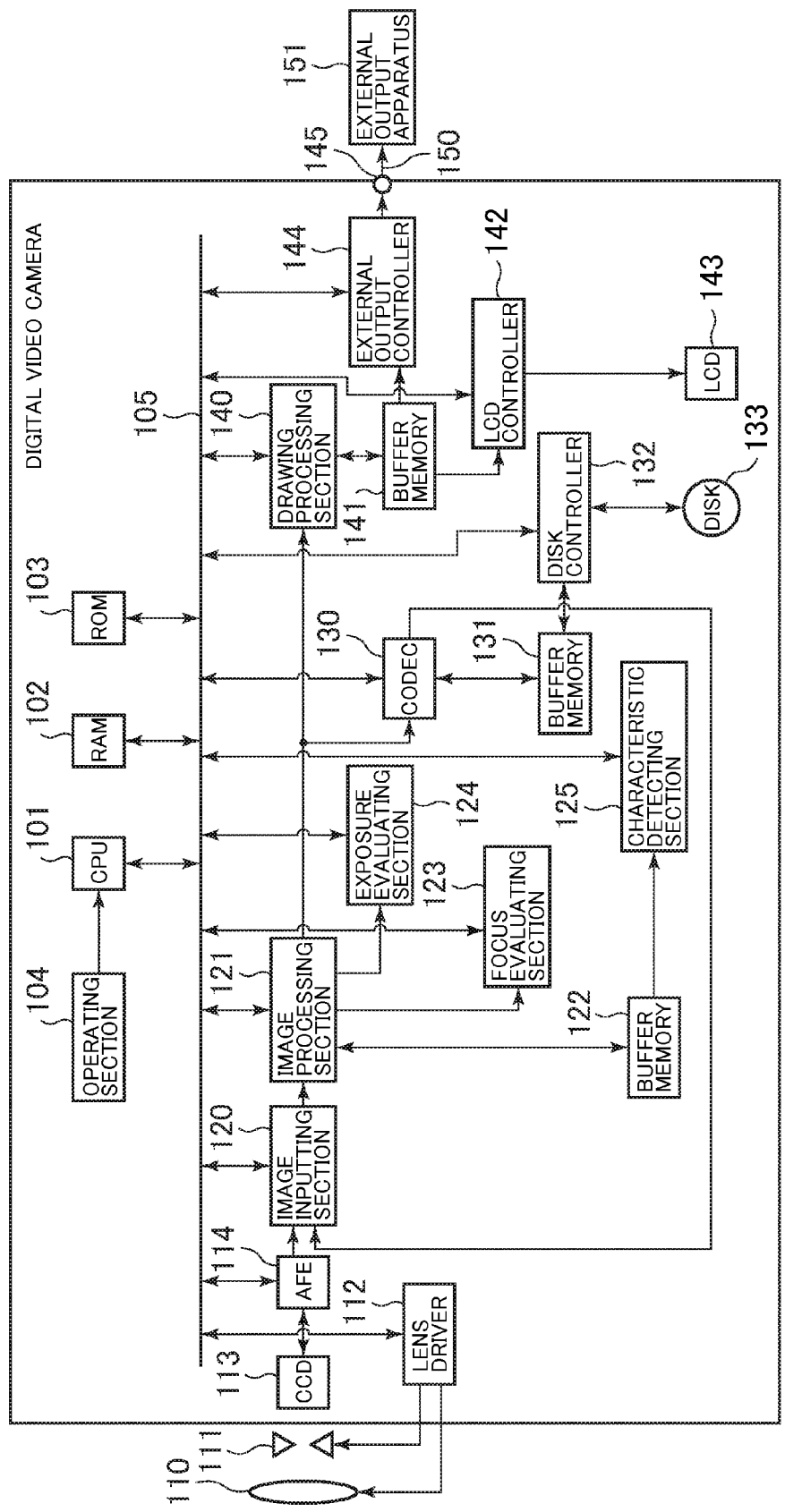
FIG. 1 is a block diagram of a digital video camera as an image processing apparatus according to an embodiment of the present invention.

FIG. 1 is a block diagram of an image processing apparatus according to the embodiment of the present invention. Here, as the image processing apparatus, a digital video camera (image pickup apparatus) that records a moving image in a disk-shaped storage medium is taken as an example.

As shown in FIG. 1, a digital video camera 100 is provided with a CPU 101, a RAM 102, a ROM 103, an operating section 104, and an internal bus 105 as a control system block.

The CPU 101 is connected to the RAM 102, the ROM 103 and each of other blocks through the internal bus 105, and controls each block by a control program stored in the ROM 103.

The CPU 101 uses the RAM 102 as a storage device for temporary data at the time of operation. The operating section 104 connected to the CPU 101 has a variety of operational levers and buttons which are operated by the user, and information inputted by these operations is transmitted to the CPU 101. The CPU 101 can perform a variety of processing in accordance with a direction of the user (namely, the input information).

Further, as shown in FIG. 1, the digital video camera 100 is provided with a focus lens 110, an aperture 111, a lens driver 112, a CCD image sensor (CCD) 113, and an AFE 114 as a camera system block.

Light having passed through the focus lens 110 forms an image on an image pickup surface of the CCD image sensor 113, and the optical image on the image pickup surface is converted into an electrical signal.

The lens driver 112 drives the focus lens 110 and the aperture 111 by control of the CPU 101 to adjust focus and an aperture amount. Based on a shutter speed directed by the CPU 101, the AFE 114 drives the CCD image sensor 113 to read an image signal so as to perform sample and hold the image signal, amplify the signal and convert the signal into a digital signal.

As shown in FIG. 1, the digital video camera 100 is provided with an image inputting section 120, an image processing section 121, a buffer memory 122, a focus evaluating section 123, an exposure evaluating section 124, and a characteristic detecting section 125 as an image processing system block.

By control of the CPU 101, an image signal is inputted into the image inputting section 120 from the AFE 114 at the time of image capturing, and from a CODEC 130 (described later) at the time of playback. Using the buffer memory 122, the image processing section 121 performs a variety of image signal processing, such as color conversion and resolution conversion, on the image signal outputted from the image inputting section 120.

The focus evaluating section 123 and the exposure evaluating section 124 respectively evaluate states of focus and exposure with respect to a plurality of regions included in the image signal obtained from the image processing section 121. The characteristic detecting section 125 detects the number of characteristic portions included in the image, and sizes and positions thereof, from the image signal read from the buffer memory 122.

In the present embodiment, a person's face portion is detected as the characteristic portion included in the image. As a method for detecting a face portion, there are methods using learning, typified by a neural network and a support vector machine. Further, there is a method of extracting a characteristic region in physical shape such as an eye or a nose from an image region by template matching. Moreover, as shown in Japanese Laid-Open Patent Publication (Kokai) No. 10-232934 and Japanese Laid-Open Patent Publication (Kokai) No. 2000-48184, there are methods of detecting an image characteristic amount of a skin color or an eye shape and analyzing the amount by means of statistical technique, or some other method. In the present invention, any one of these methods may be used.

Further, as shown in FIG. 1, the digital video camera 100 is provided with the CODEC 130, a buffer memory 131, a disk controller 132, and a disk 133 as a recorder system block.

At the time of recording of a captured image, by control of the CPU 101, the CODEC 130 encodes the image signal obtained from the image processing section 121 and writes it in the buffer memory 131. The disk controller 132 stores the code data written in the buffer memory 131 on the disk 133 (storage medium such as a DVD).

On the contrary, at the time of playback of the recorded image, by control of the CPU 101, the disk controller 132 writes the code data read from the disk 133 in the buffer memory 131, and the CODEC 130 decodes the data.

Further, as shown in FIG. 1, the digital video camera 100 is provided with a drawing processing section 140, a buffer memory 141, an LCD controller 142, an LCD 143, an external output controller 144, and an external terminal 145 as a display system block.

The drawing processing section 140 superimposes a signal of a letter, a graphic or the like, drawn based on a direction of the CPU 101, on the image signal obtained from the image processing section 121, and writes the obtained image signal in the buffer memory 141. The LCD controller 142 outputs the image signal, read from the buffer memory 141, into the LCD 143 to make it displayed.

Further, the external output controller 144 outputs the image signal read from the buffer memory 141 to an external output apparatus 151 connected to the external terminal 145 through a connection cable 150. It is thereby possible to display the image in the external output apparatus 151.

It is to be noted that the focus lens 110, the aperture 111 and the CCD image sensor 113 function as a image pickup unit for capturing an image.

Further, the characteristic detecting section 125 functions as a characteristic detecting unit for detecting a characteristic portion from a captured image. The characteristic detecting section 125 receives an image signal in a predetermined cycle from a plurality of frames of image signals which constitute a moving picture, and detects a characteristic portion.

The focus evaluating section 123 and the exposure evaluating section 124 function as a state evaluating unit for evaluating a capturing state of a captured image.

The CPU 101 and the lens driver 112 function as a control unit for controlling the image pickup unit in accordance with a capturing state with respect to a characteristic portion.

When a plurality of characteristic portions are detected by the characteristic detecting unit, the CPU 101 as the control unit controls the image pickup unit in accordance with a capturing state prioritizing a characteristic portion being detected for a long period of time.

Here, in prioritizing a characteristic portion being detected for a long period of time from among a plurality of characteristic portions being detected, the CPU 101 sets a priority to each characteristic portion, including a size of each characteristic portion or/and a distance from the center of each characteristic portion to the center of the image.

Further, the CPU 101 controls a image pickup unit in accordance with a characteristic portion being detected for the longest period of time.

The focus evaluating section 123 as the state evaluating unit performs ranging on the captured image, and the lens driver 112 controls a focus of the focus lens 110.

As the state evaluating unit, the exposure evaluating section 124 performs photometry on the photographed image, and the lens driver 112 controls exposure of the aperture 111.

The image inputting section 120 functions as an input unit for inputting an image.

The characteristic detecting section 125 functions as a characteristic detecting unit for detecting a characteristic portion from the inputted image.

The drawing processing section 140 functions as a drawing unit for drawing an arbitrary graphic on the inputted image.

The CPU 101 also functions as a control unit for controlling the drawing unit so as to draw a graphic on a characteristic portion detected by the characteristic detecting unit.

When a plurality of characteristic portions are detected by the characteristic detecting unit, the CPU 101 controls the drawing unit so as to draw a predetermined graphic on each characteristic portion in accordance with a length of time when each characteristic portion is being detected.

When a plurality of characteristic portions are detected by the characteristic detecting unit, the CPU 101 controls the drawing unit so as to draw a graphic on a characteristic portion being detected for the longest period of time, the graphic being different from those with respect to the other characteristic portions.

The CPU 101 controls a drawing unit so as to draw a rectangular frame surrounding a characteristic portion.

The above descriptions will be specifically described below in a sequential manner.

Next described will be an operation performed in the case of image capturing with respect to a plurality of objects by use of the digital video camera 100.

(First Embodiment)

Figure 2:
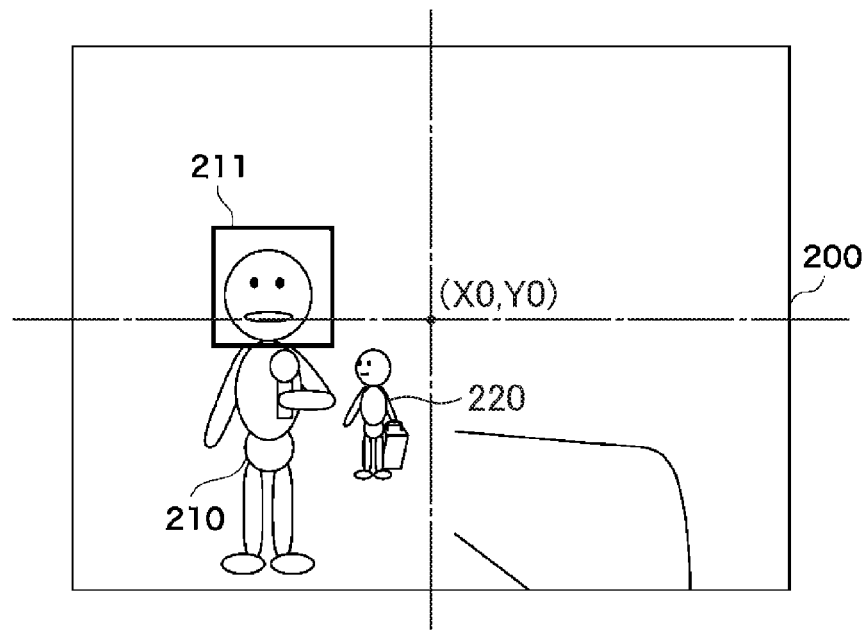
FIG. 2 is a view showing an example of an output image of the digital video camera, outputted to an LCD or an external output device shown in FIG. 1.

FIG. 2 is a view showing an example of an output image of a video camera, outputted to the LCD or the external output apparatus shown in FIG. 1.

A person 210 whom a photographer (user) is going to capture and a person 220 as a passerby are in an output image 200. It is to be noted that a point (X0, Y0) shown in FIG. 2 is the center of the output image 200. This center (X0, Y0) is not actually displayed in the output image 200. In FIGS. 3, 4 and 7 to 9 which will be described later, the center (X0, Y0) is not shown.

The characteristic detecting section 125 determines a face portion of the person 210 as a characteristic portion and detects a size and position thereof. On the other hand, the characteristic detecting section 125 does not detect the person 220 here since the face portion thereof is small relative to the whole of the image.

An object list is stored in the RAM 102, and the CPU 101 updates this object list based on a result of detection in the characteristic detecting section 125. The CPU 101 obtains evaluation results of focus and exposure with respect to the face portion of the person 210 from the focus evaluating section 123 and the exposure evaluating section 124. Based on those, the CPU 101 controls the lens driver 112 and the AFE 114 to adjust the focus and exposure (an aperture amount and a shutter speed). The CPU 101 controls the drawing processing section 140 to draw a detection frame 211 on the face portion of the person 210 and output an image signal with the frame superposed thereon.

Figure 3:
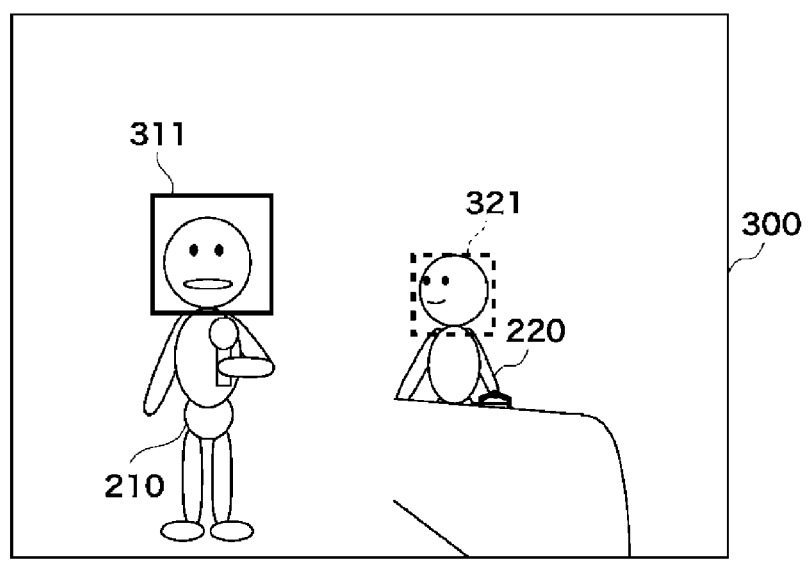
FIG. 3 is a view showing an example of an output image after the lapse of a predetermined period of time from the time when the output image of FIG. 2 was obtained.

FIG. 3 is a view showing an example of an output image after the lapse of a certain period of time from the time when the output image of FIG. 2 was obtained.

In an output image 300 of FIG. 3, as compared with FIG. 2, the person 220 as the passerby has moved to the near side on the right, and the face portion thereof has become larger. Consequently, the characteristic detecting section 125 has newly detected a size and a position of the face portion of the person 220 in addition to those of the face portion of the person 210.

The CPU 101 updates the object list and determines the person 210, being detected for a longer period of time, as an object to be prioritized. Then, as in the case of FIG. 2, the CPU 101 adjusts focus and exposure based on evaluation results of the focus and exposure with respect to the face portion of the person 210.

Further, the CPU 101 controls the drawing processing section 140 to draw a detection frame 311 by a solid line with respect to the face portion of the person 210 as the object to be prioritized and a detection frame 321 by a broken line with respect to the face portion of the person 220 as another object, and output an image signal with those frames superposed thereon.

Figure 4:
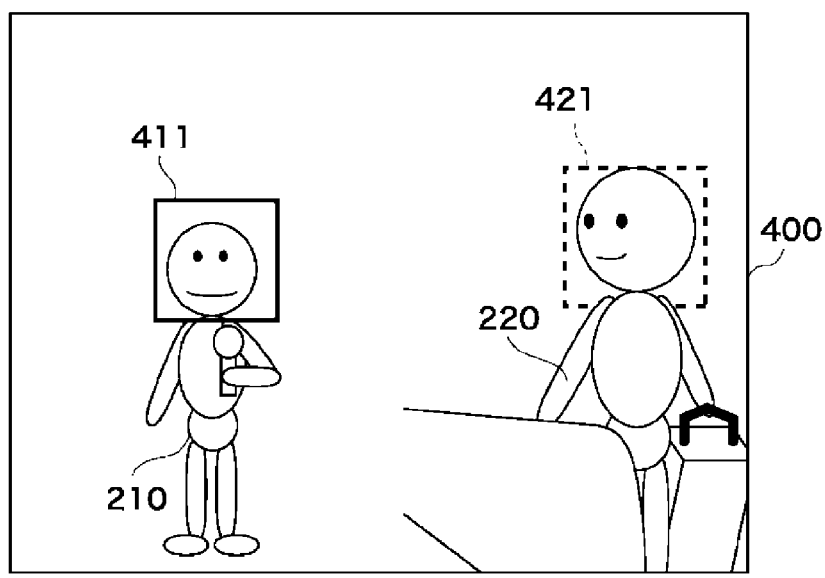
FIG. 4 is a view showing an example of an output image after the lapse of a predetermined period of time from the time when the output image of FIG. 3 was obtained.

FIG. 4 is a view showing an example of an output image after the lapse of a certain period of time from the time when the output image of FIG. 3 was obtained.

As compared with FIG. 3, in an output image 400 of FIG. 4, the person 220 as the passerby further moves to the near side on the right and the face portion thereof has become larger than the face portion of the person 210.

In accordance with a result of detection by the characteristic detecting section 125, the CPU 101 updates the object list stored in the RAM 102. Then, as in the case of FIG. 3, the CPU 101 determines the person 210, being detected for a longer period of time, as the object to be prioritized, and adjusts focus and exposure based on evaluation results of the focus and exposure with respect to the face portion of the person 210.

Further, as in the case of FIG. 3, the CPU 101 controls the drawing processing section 140 to respectively draw respective detection frames 411, 421 by a solid line and a broken line on the face portions of the person 210 and the person 220, and output an image signal with those frames superposed thereon.

Figure 5:
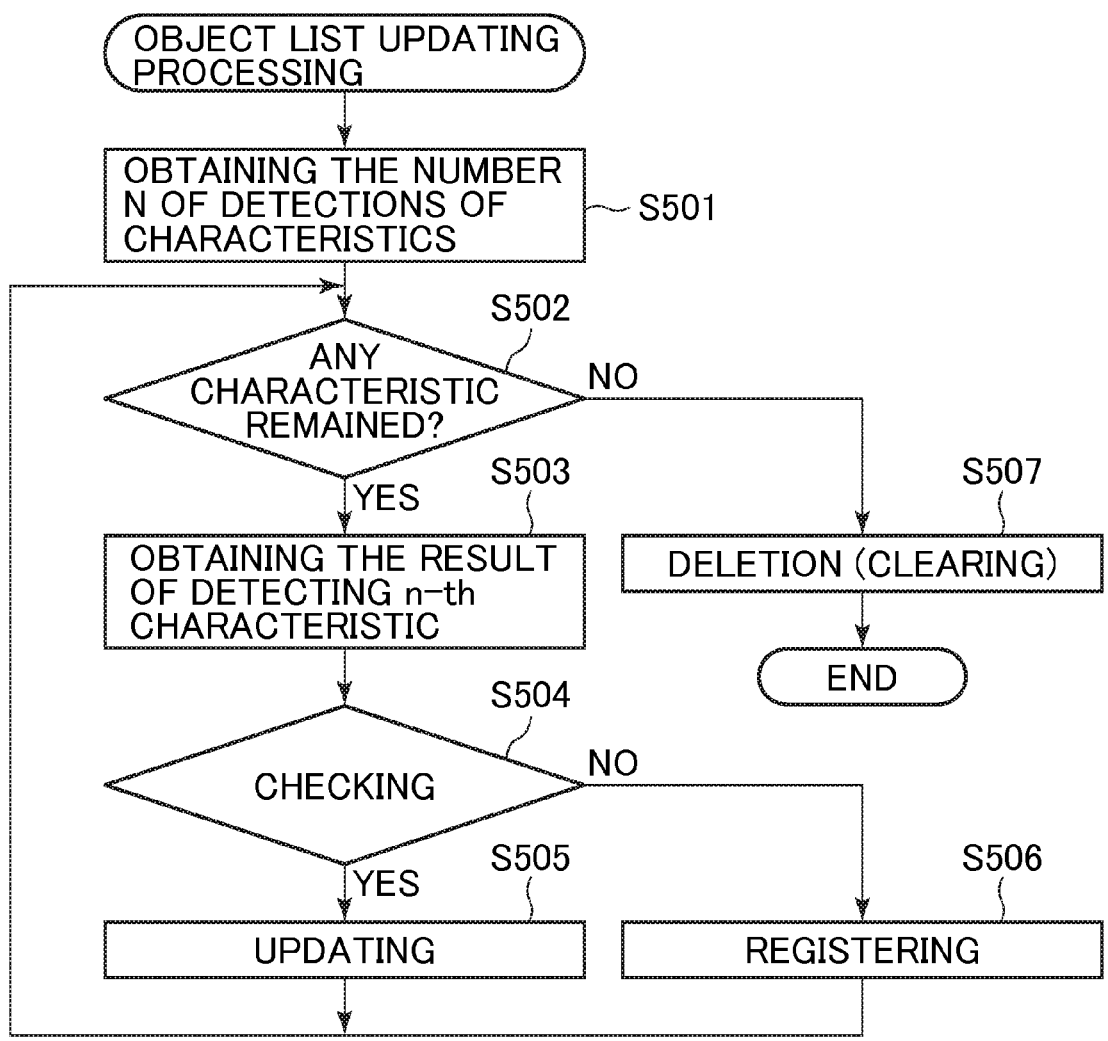
FIG. 5 is a flowchart showing a procedure of object list updating processing that is implemented by the digital video camera shown in FIG. 1.

FIG. 5 is a flowchart showing a procedure of updating processing of the object list, the procedure is implemented by the digital video camera shown in FIG. 1. The updating processing of the object list is performed every time the characteristic detecting section 125 implements characteristic extraction with respect to a new image signal.

The present processing is implemented under control of the CPU 101 shown in FIG. 1.

Figures 6, 7:
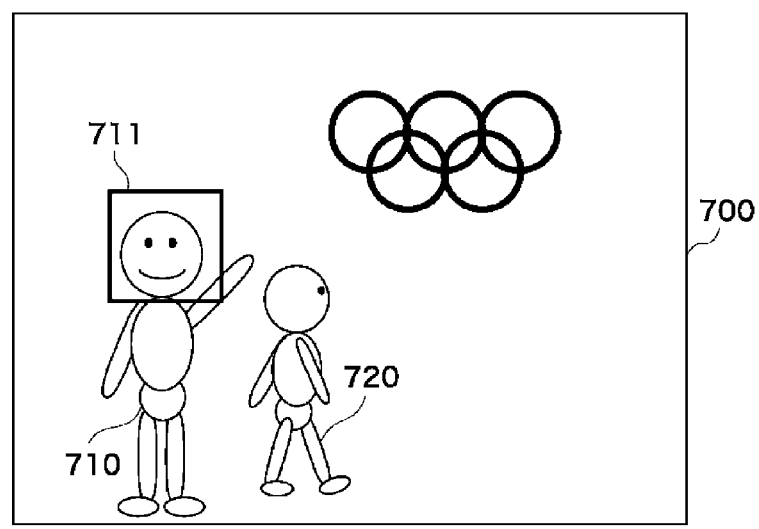
FIG. 6 is a view showing an example of an object list stored in a RAM shown in FIG. 1.
FIG. 7 is a view showing another example of the output image of the digital video camera, outputted to the LCD or the external output device shown in FIG. 1.

FIG. 6 is a view showing an example of the object list stored in the RAM shown in FIG. 1.

In the object list stored in the RAM 102, a position (x, y), a width w, and detection time t of an object are registered. "x" denotes a horizontal position, and "y" denotes a vertical position. The detection time t when a predetermined object is being detected can also be represented by the number of frames where the object was detected. It is to be noted that the characteristic detecting section 125 of the present embodiment detects the width w of a square including a characteristic portion as a size of the characteristic portion.

In step S501 of FIG. 5, from the characteristic detecting section 125, the CPU 101 obtains the number N of characteristic portions detected from an image signal. When a characteristic portion not checked with the object list remains in step S502, a size and a position of an n-th characteristic portion is obtained in step S503 (here, $1 \leq n \leq N$, and "n" is counted up every time).

Subsequently, it is checked in step S504 whether or not an element, whose size and position are close to or the same as the size and the position obtained in step S503, is registered in the object list. When the corresponding element is found in the object list, in step S505, the size and the position of the element are updated and the detection time (period) of (the time for detecting) the element is counted up.

When the corresponding element is not registered, in step S506, the element is newly registered as an element of the object list along with the size and the position thereof, and the detection time of the element is counted up.

When all the characteristic portions have been checked up in step S502, in step S507, the element not updated for a predetermined period of time is deleted (cleared), and the detection time of the element is cleaned to zero. The element is held for a predetermined period of time before deleted in order to prevent the element from being deleted immediately in a case where detection of a characteristic portion of an object to be captured happens to fail (accidentally or unfortunately fails) for a reason such that the object to be captured looks away or another person passes over. The present processing is then completed.

With such a configuration, camera control can be performed in an appropriate manner for capturing a person whom the photographer is going to capture by putting the person into an image capturing range for a longer period of time than another person. Further, on the screen of the LCD, the external output apparatus or the like, it can be easily confirmed which person the apparatus prioritizes in operating.

(Second Embodiment)

Next, a digital video camera of a second embodiment will be described. The digital video camera of the second embodiment is different from the digital video camera of the first embodiment in the method in which the CPU 101 determines an object to be prioritized.

An operation in the case of capturing a plurality of objects by use of the digital video camera 100 will be described.

FIG. 7 is a view showing an example of an output image of the digital video camera, outputted to the LCD or the external output apparatus shown in FIG. 1.

As shown in FIG. 7, a person 710 whom the photographer is going to capture and a person 720 walking behind the person 710 are in an output image 700. The characteristic detecting section 125 takes a face portion of the person 710 as a characteristic and detects a size and a position of the face portion. On the other hand, the characteristic detecting section 125 does not detect a face portion of the person 720 since it is not facing the near side.

The CPU 101 updates the object list based on a result of detection by the characteristic detecting section 125. The CPU 101 obtains evaluation results of focus and exposure with respect to the face portion of the person 710 from the focus evaluating section 123 and the exposure evaluating section 124, and based on those, the CPU 101 controls the lens driver 112 and the AFE 114 to adjust the focus and exposure (an aperture amount and a shutter speed).

Further, the CPU 101 controls the drawing processing section 140 to draw a detection frame 711 on the face portion of the person 710 and output an image signal with the frame superposed thereon.

Figure 8:
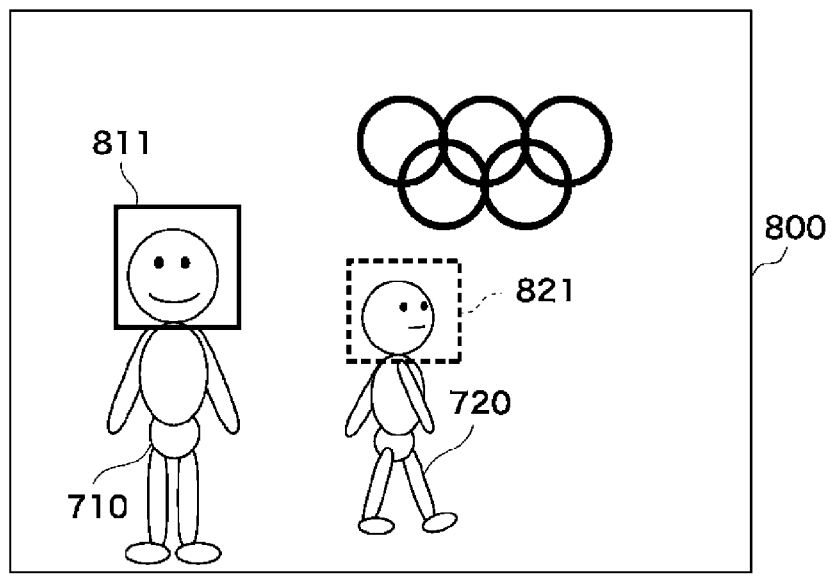
FIG. 8 is a view showing an example of an output image after the lapse of a predetermined period of time from the time when the output image of FIG. 7 was obtained.

FIG. 8 is a view showing an example of an output image after the lapse of a certain period of time from the time when the output image of FIG. 7 was obtained.

In an output image 800 of FIG. 8, as compared with FIG. 7, the person 720 walking behind has moved to the center backside, and the face portion is turned to face the near side, and hence the characteristic detecting section 125 has newly detected a size and a position of the face portion of the person 720 in addition to those of the face portion of the person 710.

The CPU 101 updates the object list. Further, the CPU 101 determines the person 710 as an object to be prioritized from a length of the time when the person 710 is being detected, and the position and the size thereof, and adjusts focus and exposure based on evaluation results of the focus and exposure with respect to the face portion of the person 710, as in the case of FIG. 7.

Moreover, the CPU 101 controls the drawing processing section 140 to draw a detection frame 811 by a solid line on the face portion of the person 710 as the object to be prioritized and a detection frame 821 by a broken line on the face portion of the person 720 as another object, and output an image signal with those frames superimposed thereon.

Figure 9:
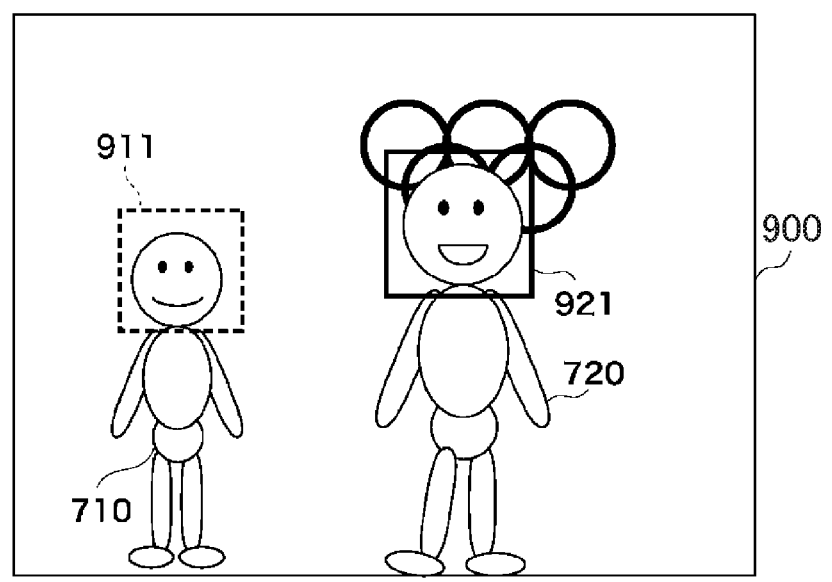
FIG. 9 is a view showing an example of an output image after the lapse of a predetermined period of time from the time when the output image of FIG. 8 was obtained.

FIG. 9 is a view showing an example of an output image after the lapse of a certain period of time from the time when the output image of FIG. 8 was obtained.

As compared with FIG. 8, in an output image 900 of FIG. 9, the person 720 who was walking behind has moves to the near side toward the photographer, and the face portion thereof has become larger than the face portion of the person 710.

It is assumed here that, since the photographer is going to capture the person 720 as the principal object in place of the person 710, the photographer keeps on capturing in the same position even when the person 720 in large size is getting into the center of the image.

In accordance with a result of detection by the characteristic detecting section 125, the CPU 101 updates the object list. This time, the CPU 101 determines the person 720 as the object to be prioritized, from a length of the detection time of detecting the person 720, and a position and a size thereof. The CPU 101 then adjusts focus and exposure based on evaluation results of the focus and exposure with respect to the face portion of the person 720.

Further, the CPU 101 controls the drawing processing section 140 to respectively draw detection frames 921, 911 by a solid line and a broken line on the respective face portions of the person 720 and the person 710, and output an image signal with those frames superposed thereon.

Figure 10:
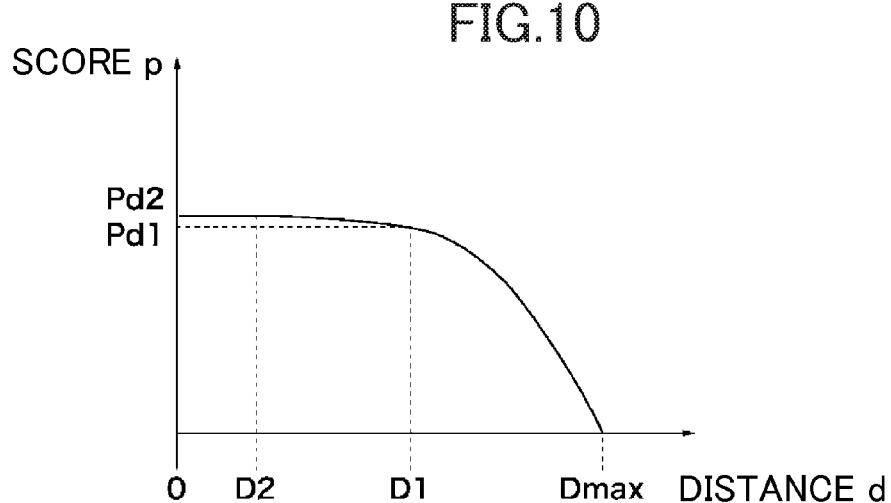
FIG. 10 is a graph showing scores with respect to distances of an object in the digital video camera shown in FIG. 1.
Figure 11:
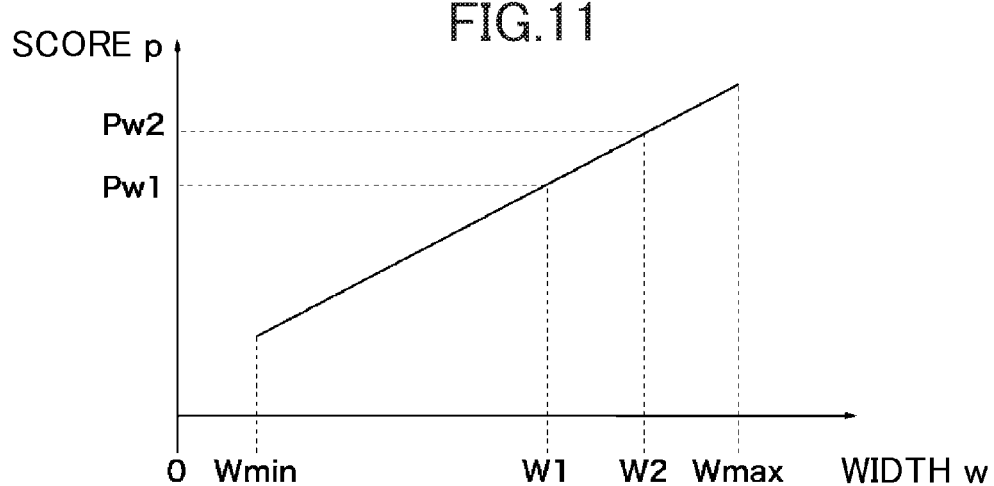
FIG. 11 is a graph showing scores with respect to widths of the object in the digital video camera shown in FIG. 1.
Figure 12:
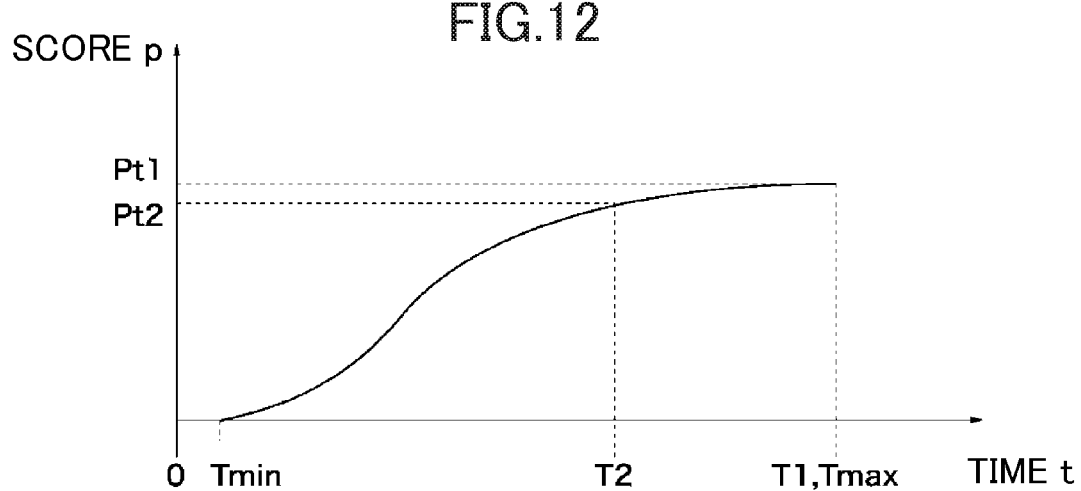
FIG. 12 is a graph showing scores with respect to detection time of the object in the digital video camera shown in FIG. 1.

FIGS. 10, 11 and 12 are graphs respectively showing rates by scores at which a distance, a size of an object and a length of the detection time of the object are considered when the CPU 101 determines an object to be prioritized.

In FIG. 10, the horizontal axis shows a distance d between a position (x, y) of the object and the center (X0, Y0) of the output image (cf. FIG. 2), and the vertical axis shows a score p. The closer the object is located to the center of the image, the higher the score, and as the distance d gets closer to a distance Dmax as the farthest distance from the center of the image, the score abruptly becomes lower, and then becomes zero.

For example, the score is Pd1 when the distance between the face image of the person 710 shown in FIG. 9 and the center of the image is D1, and the score is Pd2 when the distance between the face image of the person 720 shown in FIG. 9 and the center of the image is D2.

In FIG. 11, the axis of abscissas shows a width w of the object and the axis of ordinates shows the score p. A score is given even at a width Wmin of the smallest characteristic portion detectable by the characteristic detecting section 125, and the larger the width becomes to a width Wmax of the largest detectable characteristic portion, the higher the score becomes.

The score is Pw1 when a length of one side of a square including the face image of the person 710 shown in FIG. 9 is a width W1, and the score is Pw2 when a length of one side of a square including the face image of the person 720 is a width W2.

In FIG. 12, the horizontal axis shows time t when the object is being detected, and the vertical axis shows the score p. The score remains zero until the time Tmin as a threshold, and the score gradually increases when the object continues to be detected after Tmin. The increase in score is suppressed as the time gets closer to the time Tmax, and when the time reaches Tmax, counting up the time with respect to the object is stopped and the score will no longer increase.

The score is Pt1 when the detection time of the person 710 shown in FIG. 9 is T1, and the score is Pt2 when the detection time of the person 720 is T2.

In FIG. 9, since a total score (Pd2+Pw2+Pt2) of the person 720 is higher than a total score (Pd1+Pw1+Pt1) of the person 710, the CPU 101 determines the person 720 as the object to be prioritized.

With such a configuration, when the person whom the photographer is going to capture is being captured closer to the center in larger size for a longer period of time, comprehensively judging from those elements, camera control can be performed in an appropriate manner for capturing the intended person. Further, on the screen of the LCD, the external output apparatus or the like, it can be easily confirmed which person the apparatus prioritizes in operating.

As thus described, according to each of the foregoing embodiments, since an object to be prioritized is determined in view of the time when a characteristic portion is being detected, it is possible to more appropriately auto-select a intended object and perform camera control.

The configuration of determining an object to be prioritized in view of the time when a characteristic portion is being detected is applicable not only to camera control but also to the time of playback of an image signal. For example, first, a luminance value and a state of a color signal of an object to be prioritized are evaluated. Then, it is possible to perform image processing, such as luminance correction, color correction and the like on the image signal for making the evaluated value become the optimum value, or production of an index image based on a signal of an image with the object.

In the case of being applied to the time of playback of the image signal, the present invention is used not exclusively to the camera, but is also applicable, for example, to a personal computer equipped with an image processing function. Further, the present invention is also applicable to a system configured of a plurality of devices (e.g. a host computer, an interface device and the like, constituting the image processing apparatus).

It is to be noted that, although the case of detecting a person's face as a characteristic portion of an object was described in the foregoing embodiments, the present invention is not restricted to the face but is applicable to any case so long as an object satisfying a previously set condition is to be detected.

Further, it is to be understood that the objective of the present invention may be also accomplished in the following manner. First, a storage medium in which a program code of software that realize the function of the embodiments describe above is stored is supplied to a system or an apparatus. Subsequently, a computer (or CPU, or MPU) of the system or the apparatus reads out and executes the program code stored in the storage medium. In this case, the program code itself read from the storage medium realizes the functions of any of the embodiments described above, and the program code and the storage medium in which the program is stored configure the present invention.

Moreover, the function of the embodiments describe above is realized not only by executing the program code read by the computer, but also in the following manner. Namely, an operating system (OS) running on the computer, or the like, performs part or all of actual processing based on a instructions in the program code, and the function of the embodiments describe above is realized by that processing. Examples of the storage medium for supplying the program code include a hard disk, a ROM, a RAM, a nonvolatile memory card, a CD-ROM, a CD-R, a DVD, an optical disk, an optical magnetic disk, MO and so on. Further, it is possible to use a computer network such as a LAN (local area network) or a WAN (wide area network) for supplying the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-051930 filed Mar. 3, 2008, which is hereby incorporated by reference herein in its entirety.

What is claimed is:

1. An image processing apparatus comprising:
   a detecting unit adapted to detect a plurality of objects from an image signal constituting a moving image; and
   a control unit adapted to set a priority to at least one of the plurality of objects when the detecting unit detects the plurality of the objects,
   wherein the control unit:
   stores in a memory unit data associated with at least one of the detected plurality of objects;
   determines, when the detecting unit newly detects an object, whether or not one of the detected plurality of objects and the newly detected object are identical;
   counts up, in a case where the control unit determines that the one of the detected plurality of objects and the newly detected object are identical, a detected duration of the one of the detected plurality of objects being identical; and
   sets, based on at least the detected duration, a higher priority to the one of the detected plurality of objects being identical for a longer duration.

2. The image processing apparatus according to claim 1, wherein the control unit also sets a priority to at least one of the plurality of objects based on at least one of a size thereof or a distance from the center of each object to the center of an output image of the moving image.

3. The image processing apparatus according to claim 1, further comprising:
   a image pickup unit adapted to capture the moving image; and
   a state evaluating unit adapted to evaluate a capturing state of the moving image captured by the image pickup unit,
   wherein the control unit, when the detecting unit detects the plurality of the objects, controls the image pickup unit in accordance with the capturing state prioritizing the one of the detected plurality of objects being identical for the longer duration.

4. The image processing apparatus according to claim 1, further comprising:
   a drawing unit adapted to draw a predetermined graphic on the moving image,
   wherein the control unit, when the plurality of the objects are detected by the detecting unit, controls the drawing unit to draw the predetermined graphic on at least one of the plurality of objects in accordance with a length of the detected duration of at least one of the plurality of objects.

5. The image processing apparatus according to claim 1, further comprising:
   an image processing unit adapted to perform image processing, including at least either luminance correction or color correction, on the moving image,
   wherein the control unit, when the plurality of the objects are detected by the detecting unit, controls the image processing unit in accordance with a state of the one of the detected plurality of objects being identical for the longer duration during prioritizing thereof.

6. The image processing apparatus according to claim 1, wherein the detecting unit detects a person's face.

7. A method of processing an image with an image processing apparatus having a detecting unit and a control unit, the method comprising:

a detecting step of detecting a plurality of objects from an image signal constituting a moving image;
   a priority setting step of setting a priority to at least one of the plurality of objects when the detecting step detects the plurality of the objects;
   a storing step of storing in a memory unit data associated with at least one of the detected plurality of objects;
   a determining step of determining, when the detecting step newly detects an object, whether or not one of the detected plurality of objects and the newly detected object are identical;
   a counting step of counting up, in a case where the determining step determines that the one of the detected plurality of objects and the newly detected object are identical, a detected duration of the one of the detected plurality of objects being identical; and
   a higher priority setting step of setting, based on at least the detected duration, a higher priority to the one of the detected plurality of objects being identical for a longer duration,
   wherein the detecting unit executes the detecting step, and
   wherein the control unit executes the storing step, the priority setting step, the determining step, the counting step, and the higher priority setting step.

* * * * *